US006328894B1

(12) United States Patent
Chan et al.

(10) Patent No.: US 6,328,894 B1
(45) Date of Patent: Dec. 11, 2001

(54) PROCESSES OF PURIFYING A DISPERSION AND MAKING INKJET INKS

(75) Inventors: Michael K. Chan, Waltham, MA (US); Joseph E. Johnson; John Mathew, both of Nashua, NH (US); Friedrich K. von Gottberg, Cambridge, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/240,291

(22) Filed: Jan. 29, 1999

Related U.S. Application Data

(60) Provisional application No. 60/072,978, filed on Jan. 29, 1998.

(51) Int. Cl.[7] .......................... B01D 21/26; B01D 61/14; B01D 61/44

(52) U.S. Cl. ...................... 210/638; 106/31.65; 204/520; 204/522; 210/650; 210/651; 210/652; 210/663; 210/669; 210/787; 516/32; 516/34; 516/38; 516/81; 516/90; 516/921

(58) Field of Search ................................ 516/32, 34, 38, 516/81, 90, 921; 106/31.65, 472, 476; 210/650, 651, 638, 652, 663, 669, 787; 204/520, 522

(56) References Cited

U.S. PATENT DOCUMENTS

| | | | |
|---|---|---|---|
| 2,439,422 | 4/1948 | Amon et al. . | |
| 4,252,718 * | 2/1981 | Atherton et al. | 210/650 X |
| 4,693,879 | 9/1987 | Yoshimura et al. | 423/461 |
| 4,810,390 * | 3/1989 | Flierl et al. | 210/650 X |
| 5,017,291 * | 5/1991 | Semler et al. | 210/650 X |
| 5,281,261 | 1/1994 | Lin | 106/20 R |
| 5,571,311 | 11/1996 | Belmont et al. | 106/20 R |
| 5,622,628 * | 4/1997 | Trendell et al. | 210/650 X |
| 5,630,868 | 5/1997 | Belmont et al. | 160/31.75 |
| 5,637,138 | 6/1997 | Yamazaki | 106/31.32 |
| 5,656,072 | 8/1997 | Kato et al. | 106/31.58 |
| 5,716,435 * | 2/1998 | Aida et al. | 106/31.65 X |

FOREIGN PATENT DOCUMENTS

| | | | |
|---|---|---|---|
| 0 475 075 A1 | 3/1992 | (EP) | C09D/11/00 |
| 0 688 836 A2 | 6/1995 | (EP) | C09D/11/02 |
| 0 802 247 A2 | 10/1997 | (EP) | C09D/11/00 |
| 668 724 | 3/1952 | (GB) . | |
| 56-147865 | 11/1981 | (JP) | C09D/11/00 |
| 57-21466 | 2/1982 | (JP) | C09D/11/00 |
| 0072739 * | 4/1985 | (JP) | 210/650 |
| 64-48875 | 2/1989 | (JP) | C09D/11/16 |
| WO 96/18695 | 6/1996 | (WO) . | |

OTHER PUBLICATIONS

Perry et al.: *Chemical Engineers'Handbook*, Fifth Edition McGraw–Hill Book Co., New York, pp. 1752–1757, 1973.*

Database WPI, Section Ch. Week 8914, Derwent Publications Ltd., London, GB; Class G02,AN 89–102935 XP000058694 & JP 01 048875 A (Mitsubishi Pencil Co.), Feb. 23, 1989.

* cited by examiner

*Primary Examiner*—Richard D. Lovering

(57) ABSTRACT

A process to purify and classify a dispersion containing stabilized particles having counterions and ions as well as free species is disclosed. The solution may comprise an aqueous media, a solvent media, or a combination of both and can include more than one type of aqueous and/or solvent solutions. The process includes at least the steps, in any order, of substantially removing the particles having sizes above about 1 micron, preferably above 0.5 micron; substantially removing the free species; and exchanging at least a portion of the counterions that are a part of the stabilized particles. The process disclosed is especially useful in purifying dispersions where the ionic stabilized colloidal particles are carbon black having attached organic groups comprising at least one ionic group, or at least one ionizable group, or mixtures thereof.

46 Claims, 1 Drawing Sheet

PROCESSES OF PURIFYING A DISPERSION AND MAKING INKJET INKS

This application claims priority to U.S. Provisional Patent Application No. 60/072,978, filed on Jan. 29, 1998.

BACKGROUND OF THE INVENTION

1.Field of the Invention

The present invention relates to purification and classification methods, and more particularly relates to the purification and classification of dispersions containing colloidal particles.

2. Description of the Art

In processes which form stabilized colloidal particles (e.g., carbon black having attached an organic group containing at least one ionic group or one ionizable group), free species can co-exist in a dispersion. While such dispersions can be used in subsequent end uses such as in inks or paints and especially inkjet inks, it is desirable to remove impurities like free species from the dispersion since a purified dispersion can improve properties in the desired end product application.

Accordingly, it is desirable to develop processes which permit the purification and classification of dispersions containing stabilized colloidal particles and free species.

SUMMARY OF THE INVENTION

A feature of the present invention is to provide a process to purify a dispersion containing free species by removing or replacing the species.

Another feature of the present invention is to provide a process for purifying a dispersion of stabilized colloidal particles, like modified carbon products having attached at least one organic group with an ionic group and/or ionizable group. An additional feature is to classify or separate the stabilized colloidal particles from large, coarse or undertreated colloidal particles.

Additional features and advantages of the present invention will be set forth in part in the description which follows, and in part will be apparent from the description, or may be learned by practice of the present invention.

To achieve these and other advantages and in accordance with the purpose of the present invention as embodied and broadly described herein, the present invention relates to a process to purify a dispersion comprising stabilized colloidal particles having cations and anions with free species in solution. In particular, the present invention relates to three primary steps in purifying a dispersion comprising stabilized colloidal particles. The three steps involve the removal or classification of particles above a certain size, the removal of free species from the dispersion, and an optional counter-ion exchange of counterions that are a part of the stabilized colloidal particles. In further detail, and as an example, the process includes the steps of substantially removing particles having a particle size above about 1 micron, and preferably above 0.5 micron. The process further includes the step or steps of substantially removing the free species and optionally exchanging at least a portion of the counterions that form a part of the stabilized colloidal particles with a different counterion or counterions. In addition, the process of the present invention can be tailored to vary or achieve a particular average particle size in order to alter the desired properties in the end product application, as well as tailor the number of colloidal particles having a size greater than about 0.5 micron.

The present invention additionally relates to a process to purify a dispersion comprising modified carbon products having attached at least one organic group, wherein at least one organic group comprises at least one ionic group, at least one ionizable group, or a mixture thereof and free species in solution. The steps of purifying would be the same as described above.

It is to be understood that both the foregoing general description and the following detailed description are exemplary and explanatory only and are intended to provide further explanation of the present invention, as claimed.

DETAILED DESCRIPTION OF THE PRESENT INVENTION

Figure 1:
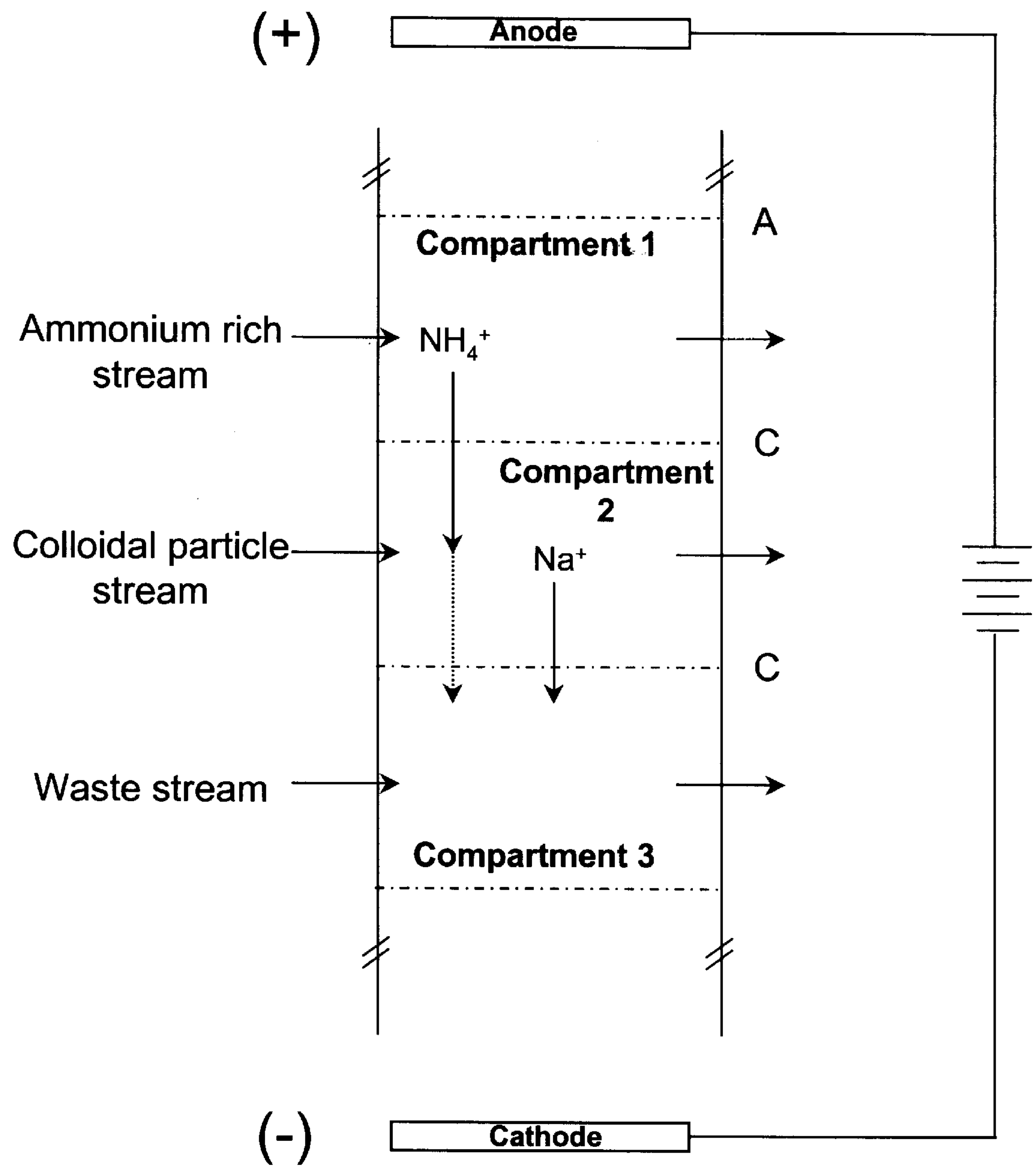
FIG. 1 is a schematic diagram of an embodiment of the process of the present invention which shows an example of a modified three compartment electrodialysis unit for exchanging sodium cations with ammonium cations. The membrane repeating unit is anion-cation-cation-(A-C-C-).

The present invention relates to a process to purify and classify a dispersion comprising stabilized colloidal particles having cations and anions as well as free species in an aqueous or solvent based (i.e., non-aqueous) solution. The process of the present invention removes or reduces impurities such as the free species, to the desired levels. Typically, the dispersion is in an aqueous-based media, a solvent-based media, or a combination of both and can include more than one type of aqueous and/or solvent solutions. Generally, the dispersion can contain any amount of solids, and preferably contains from about 1 to about 50% by weight, more preferably, from about 10% to about 25% by weight, and most preferably, from about 15% to about 20% by weight solids.

In a preferred embodiment, the dispersion is aqueous, with or without any solvent present. In particular, the present invention relates to three primary steps in purifying and classifying a dispersion comprising stabilized colloidal particles. The three steps involve the removal or classification of particles above a certain size, the removal of free species from the dispersion, and an optional ion exchange of counterions that are a part of the stabilized colloidal particles.

In further detail, and as an example, the process includes the steps of substantially removing particles having a size above about 1 micron, preferably above 0.5 micron. The particle size is characterized by the particle diameter, as measured on an ultrafine particle analyzer, such as a MICROTRAC® UPA or ACCUSIZER® optical particle sizer. The process further includes the step of substantially removing the free species and optionally exchanging at least a portion of the counterions that form a part of the stabilized colloidal particles with a different counterion or counterions. In addition, the process of the present invention can be tailored to vary or achieve a particular particle size, as well as tailor the number of particles having a size greater than 0.5 micron, in order to obtain the desired properties in the end product application.

For purposes of the present invention, "free species" means that the species are not directly attached to the colloidal particles but are in the dispersion. The term "attached" as used herein is not meant to define the particular attachment occurring but is meant to include any physical or chemical associations. The term "species" for purposes of the present invention is meant to include ionic (including counterions and co-ions) groups, ionizable groups, and organic or unreacted groups. Also, the term "stabilized" includes ionically stabilized; electrosterically stabilized; and sterically stabilized in combination with ionic and/or electrosteric stabilization.

The stabilized colloidal particles are any particles having ionic and/or ionizable groups on the colloidal particles. Preferably, the stabilization is the result of an attachment of an ionic group or ionizable group onto the colloidal particles. Examples of colloidal particles include, but are not limited to, carbon products containing carbon such as carbon black, graphite, vitreous carbon, activated charcoal, and activated carbon. Preferably, the colloidal particle is in a finely divided form. Other examples of colloidal particles include, but are not limited to, metal oxides (such as silica, alumina, titania, germania, ceria, zirconia, barium titanate), metal sulfides, polymeric latex materials, and organic pigments. The colloidal particles are preferably pigments such as carbon pigments. The stabilized colloidal particles are preferably pigments having at least one attached organic group having the ionic species, such as a carbon black having an attached organic group containing the ionic species. Preferably, the organic group comprises an aromatic group with ionic species directly attached to the carbon black. More preferably, the organic group is $—C_6H_4—COO^-X^+$; $—C_6H_4—SO_3^-X^+$; $—C_6H_2—(COO^-X^+)_3$; $—C_6H_3—(COO^-X^+)_2$; $—C_6H_3—(CF_3)_2$. $—C_6H_4—(CF_3)$; $—(CH_2)_z—(COO^-X^+)$; $—C_6H_4—(CH_2)_z—(COO^-X^+)$, wherein X is any cation such as $Na^+$, $H^+$, $K^+$, $NH_4^+$, $Li^+$, $Ca^{2+}$, $Mg^{2+}$ and the like and z is an integer from 1 to 18; $—C_6H_4—(NC_5H_5)^+Y^-$, wherein Y is any anion such as $NO_3^-$, $OH^-$, $CH_3COO^-$ and the like; or combinations thereof.

Specific examples of colloidal particles as well as examples of ionic stabilized groups are also described in U.S. Pat. Nos. 5,571,311; 5,630,868; 5,707,432, and 5,803,959; and PCT Publication No. WO 96/18688, all hereby incorporated in their entirety by reference herein.

In the process of the present invention, a substantial amount of the free species are removed from the dispersion containing the stabilized colloidal particles. Also, in a preferred embodiment, at least a portion of the counterion or counterions on the stabilized colloidal particles are exchanged for a desired or alternate counterion or counterions which provides, for example in an inkjet ink dispersion, improved dispersion, improved dispersion stability, and/or improved ink properties (e.g. faster drying time, enhanced print quality, print waterfastness, additive compatibility) and in a paint dispersion, improve paint properties (e.g. improved film properties due to lack of ions and improved fast drying). Preferably, at least a portion of the cations that are part of the ionic stabilized colloidal particles are replaced with $NH_4^+$.

Also, in the process of the present invention, it is preferred that any particles above a particle size of about 1 micron, preferably above 0.5 micron are removed.

The particular order of steps described above can be in any order and each step may be repeated one or more times as desired. In one embodiment, particles having a particle size above about 1 micron, preferably above about 0.5 micron, are substantially removed before substantially removing the free species and optionally exchanging at least a portion of the counterions that are part of the ionic stabilized colloidal particles with a different counterion or counterions, such as $Na^+$, $H^+$, $K^+$, $Li^+$, $NH_4^+$, $Ca^{2+}$, $Mg^{2+}$, $Cl^-$, $NO_3^-$, $NO_2^-$, acetate, carboxylate, and $Br^-$.

With respect to removing or classifying particles having a particle size above about 1 micron, preferably above 0.5 micron, such a step can be accomplished by techniques known to those skilled in the art, such as centrifugation, filtering, sedimentary and similar classification devices. For example, any centrifugation device can be used as long as it is capable of removing particles having a size above about 1 micron, preferably above about 0.5 micron. Suitable examples include, but are not limited to, solid-bowl centrifugation, tubular-bowl centrifugation, and rotary classifier. Centrifugation devices can be obtained from Carr Separations, Alfa Lavel Sharples, or Bird.

For centrifugation devices, the centrifugation typically occurs at a centrifugal force sufficient to remove the particles having a diameter above about 1 micron, preferably above about 0.5 micron. Preferably, the centrifugation occurs at a centrifugal force of about 5,000 Gs and more preferably at a centrifugal force of at least about 15,000 Gs. Most preferably, the centrifugation occurs at a centrifugal force from about 15,000 Gs to about 20,000 Gs.

The centrifugation can be conducted at any feed rate as long as substantially all of the particles having a size above about 1 micron, and preferably above about 0.5 micron, are removed. The centrifugation can be operated in a semi-continuous feed rate, by batch, or by a continuous feed rate. Depending on the nature of the colloidal particles and type of equipment utilized, a typical feed rate would range between about 100 mL/min to about 50 L/min for a continuous centrifuge. Preferred rates vary depending on the type and treatment level, and physical properties of the colloidal particle. For example, when the colloidal particle is carbon black, the feed rate is preferably from about 500 ml/min to about 10 L/min depending on the type, size and centrifugal force of the particular centrifuge being used. Further, while the centrifugation can be operated at various temperatures, it is preferred that the centrifugation occurs at ambient temperatures and that the centrifugation include a recirculating bath. Also, during centrifugation, it is preferred that the dispersion containing the ionic stabilized colloidal particles has a viscosity of less than about 20 cP ($2\times10^{-2}$ kg/ms), more preferably from about 1 cP ($1\times10^{-3}$ kg/ms) to about 15 cP ($1.5\times10^{-2}$ kg/ms), and most preferably from about 1 cP ($1\times10^{-3}$ kg/ms) to about 8 cP ($8\times10^{-3}$ kg/ms).

Another means of removing the colloidal particles having a size above about 1 micron, preferably above about 0.5 micron, is by filtration. The filtration process can be accomplished using one or more filters, whether stepwise or singularly. The pore size Of the filters should be capable of removing colloidal particles having a particle size above about 1 micron. Preferably, the pore size of the filters are from about 0.1 micron to about 100 microns, more preferably from about 0.3 micron to about 40 microns, and most preferably from about 0.3 micron to about 0.6 micron. Further, while any flow rate can be used, this flow rate will be dependent on the filter material type, pore size, surface area, and number of filters used. Preferably, the flow rate is from about 0.14 L/($m^2$s) to about 0.47 L/($m^2$s). Examples of suitable filters include, but are not limited to, Pall Cartridge Depth Filters made of polypropylene; Cuno filters; and Osmonics filters. The filtration may be performed using multiple steps or stages, preferably between about 5 to about 10, and each consecutive step uses filters with smaller pore sizes.

After the removal of the particles having a diameter above about 1 micron, preferably above about 0.5 micron, it is preferred that less than about 1% of the total remaining colloidal particles by weight be above the particle size of about 1 micron, more preferably less than about 0.5% and, most preferably less than about 0.05%.

With regard to removing the free species in the dispersion, such a step can be accomplished by ultrafiltration/diafiltration using a membrane. Any size membrane as well as channel size can be used as long as the process permits the substantial removal of the free species while retaining substantially all of the colloidal particles. The membrane can vibrate to avoid clogging as well as to permit a higher permeate flow rate. Membrane configurations include, but are not limited to, flat sheet membranes, cross flow membranes, spiral wound tubes, or hollow fiber tubes. For example, when the colloidal particle is carbon black, a preferred membrane has a molecular weight cutoff (MWCO) of at least a 1,000 MWCO and more preferably is from about 1,000 to about 500,000 MWCO, and even more preferably is from about 10,000 MWCO to about 100,000 MWCO, and most preferably is from about 10,000 MWCO to about 50,000 MWCO. Further, it is preferred that the membrane have a channel size of from about 0.5 mm (20 mils) to about 1.5 mm (60 mils).

Any type of ultrafiltration process can be used as long as the process is capable of substantially removing the free species while retaining the colloidal particles. For instance, a cross-flow membrane separation process can be used. Particular examples of ultrafiltration devices include, but are not limited to, Pall Filtron PFS300 (cross flow flat sheet) and, Koch Membrane HF16 (hollow fiber arrangement). Preferably, when the colloidal particles are carbon black, the membrane is used in a cross flow configuration to maintain good permeate flux. Preferably, with the ultrafiltration or diafiltration process, at least about 70%, and more preferably at least 80%, and even more preferably, at least 90% and most preferably at least 95% of the free species are removed.

Another means of removing substantially all of the free species when in ionic forin in the dispersion is by electrodialysis. The process consists of membrane stacks forming narrow flow compartments. These compartments are separated by alternating cation-exchange and anion-exchange membranes which are selectively permeable to positive and negative ions respectively. The terminal compartments are bounded by electrodes for passing direct current through the whole stack. In the specific case of a carbon black (CB) dispersion, the dispersion is pumped through alternate compartments. Water is pumped through the compartments in between the CB compartments. Ion migration under the action of electric current causes salt depletion in alternate CB compartments and salt enrichment in adjacent water compartments. The CB dispersion may be recirculated until substantially all free ionic species are removed.

An alternative means of removing a substantial amount of the free ionic species from a dispersion is by an ion exchange process with or without the use of an activated carbon bed to reduce or remove undesirable organic material. In such a process, it is preferred that the ion exchange comprise an anion exchange with a $OH^-$ resin and a cation exchange with a $H^+$ resin. While the anion and cation exchange can occur simultaneously or in any other order, it is preferred that the anion exchange occur before the cation exchange. Further, when the colloidal particle is carbon black, the $OH^-$ resin and the $H^+$ resin preferably are about 500 microns in size and have an ion capacity in an amount of greater than 1 meq/ml. (milliequivalent/milliliter of dry beads).

Preferably, after the ion exchange step described above, less than about 3,500 ppm, more preferably less than about 1,000 ppm, of the total free species are present in the dispersion, based on a per gram colloidal particle (e.g. carbon black) basis. Preferably, less than about 500 ppm and more preferably, less than about 300 ppm of the total free species remaining are inorganic ionic species. Also, preferably, less than about 3,000 ppm, more preferably less than about 2,000 ppm, and most preferably less than 1,000 ppm, of the total free species remaining are organic ionic species. Amounts of less than 50 ppm of the total free species are possible with the present invention, if desired for a particular application.

The last step of the present invention relates to an ion exchange.

With regard to exchanging at least one type of counterion for another type of counterion, such as exchanging $Na^+$ with $NH_4^+$, such a process can be accomplished in an ion exchange column known to those skilled in the art. Particular examples of counterions that can be exchanged include, but are not limited to, $Na^+$, $K^+$, $Li^+$, $NH_4^+$, $Ca^{2+}$, $Mg^{2+}$, $Cl^-$, $NO_3^-$, $NO_2^-$, acetate, carboxylate, and $Br^-$.

Preferably, at least 80%, more preferably at least 90%, and most preferably at least 95% of the counterions on the stabilized colloidal particles are replaced with a different counterions.

The above described ultrafiltration/diafiltration process can be adapted to perform counterion exchange. For example, the exchange of $Na^+$ or $H^+$ counterions on the particles with any other cation such as $NH_4^+$ can be achieved by adding a salt of $NH_{4+}$, like $NH_4Cl$ to the particle dispersion. The resulting NaCl formed or excess $NH_4Cl$ salt can then be removed using the aforementioned ultrafiltration/diafiltration process.

An alternative scheme for exchanging counterions involves a modified three compartment electrodialysis unit. For a system to exchange cations, e.g., exchange sodium with ammonium, the following basic unit may be used, as shown in FIG. 1. The membrane repeating unit will be anion-cation-cation- (A-C-C-) with an ammonium rich stream in compartment 1, the colloidal particle stream (such a carbon black stream) in compartment 2 and a waste collection stream in compartment 3. The stack polarity as indicated in FIG. 1 will ensure that ammonium ions migrate from compartment 1 to compartment 2 while sodium and some ammonium ions migrate from compartment 2 to compartment 3 which contains the waste stream. This process ensures the partial exchange of ammonium for sodium counterions. An analogous scheme could be employed for anion exchange.

When the colloidal dispersion is an inkjet ink precursor, it is preferred in one embodiment to reduce the particle size by centrifugation prior to removing the free species using a diafiltration technique. In another preferred embodiment, free species are removed using a diafiltration technique prior to particle size reduction by centrifugation in order to reduce solids lost of the colloidal particle. The steps in the process of the present invention may be performed once or repeated multiple times until the desired properties are achieved.

The size reduction/classification and removal of a large percentage of the free species, such as ions and organics, in an inkjet ink precursor can improve properties, such as improved stability, improved waterfastness, higher optical density of images, lower viscosities of dispersion, and smearfastness of prints, improved print quality, wet-rub, and intercolor bleed. Ink stability, printability, and faster drying times can also be improved.

The present invention will be further clarified by the following examples which are intended to be purely exemplary of the present invention.

EXAMPLES

The following procedures were used to determine the relevant properties set forth in the examples:

Surface Area: BET nitrogen surface areas were obtained according to ASTM D-4820.

Structure: DBPA data were obtained according to ASTM D-2414.

Particle Diameter: The mean particle diameter and the maximum detectable diameter were measured using a MICROTRAC® Ultrafine Particle Analyzer from Leeds & Northrup Co. (now Honeywell), St. Petersburg, Fla. The following conditions were used: non-transparent, non-spherical particles: particle density=1.86g/$m^3$: with water as the dispersing liquid. A run time of six minutes was used. (MICROTRAC is a registered trademark of Leeds & Northrup Co.)

Ion Analyses:

Ion analyses for Tables 2 and 4: Ammonia analysis was conducted with an Orion $NH_3/NH_4^+$ electrode in accordance with ASTM D1426-89, EPA 350.3. Sodium analysis was conducted with an Orion $Na^+$ electrode in accordance with ASTM D2791, AOAC 76.25 except where noted. Nitrite analysis was conducted with an Orion $NO_2^-$ electrode in accordance with Orion's brochure Catalog Number 9746BN. Potassium analysis was determined indirectly by measuring the above-mentioned ions and doing a molar balance calculation based on the amount of extracted (ionic) material.

Ion analysis for Tables 6 and 8 was conducted with an ion chromatography column. Approximately 2.0 ml of an aqueous dispersion having 1.3% solids content was filtered through a 0.1 μm Millipore Millex-VV syringe filter and injected into a Dionex Q1C analyzer. A 50 μm portion was injected into the eluant stream (0.75 mM $NaHCO_3$/3.0 mM $Na_2CO_3$) flowing at 2 ml/min through the separator columns (HPIC-$AS_4A$) of the ion chromatograph. The eluant background was reduced by an anion micro-membrane suppressor (AMMS-II) with 0.025N $H_2SO_4$ regenerant. The sample peaks were detected by conductivity and their areas compared with peak areas of standards. Detection limit was 0.02 ppm in solution.

pH analysis:

The pH of the 15% dispersion was determined with a Corning pH meter 215.

Kontron Measurement:

The Kontron Ink Dispersion test uses image analysis to measure the number and size of un-dispersed carbon black in an aqueous medium. A diluted carbon black dispersion is spread on a glass slide using a cover slide. The sample is examined under a light microscope at a calibrated, about 500 ×, magnification. In the current method, 10 images are captured using an attached CCD camera, digitized, digitally processed to improve contrast between the agglomerates and the background, and converted to a binary (black and white) image. Objects, or "pips," are then counted and measured. The diameter of each pip, the corresponding size distribution, pip count, and % area covered by black are reported. The 10 binary images are added together to form a summary picture. Agglomerates in the size range 0.9–200 microns can be measured with this method. The "pip-count" is a direct indication of the number of particles in the size range 0.9–200 microns.

Example 1

Step 1

P-Amino benzoic acid (14.0 g), carbon black (100 g.) having a nitrogen surface area of 200 $m^2$/g and a DBPA of 122 ml/100 g., sodium nitrite (6.34 g.) and deionized water (110 g.) were mixed together in a pin pelletizer to produce product 1. Sufficient water was added to produce sample 1a having a 15% by weight solids content.

Step 2

Centrifugation was conducted on this dispersion using a Pilotfuge from Carr Separations, Inc. and operating at a centrifugation force of 15,000 G and a flow rate of 600 ml/min. Table 1 below sets forth the various parameters of the mean particle diameter, standard deviation, and the maximum particle size before (1a) and after centrifugation (1c) as determined by MICROTRAC®-UPA measurements. Either technique described in step 2 or step 3 could be used to remove particles above 1.0 micron, and particularly above 0.5 micron.

Step 3

Filtration was conducted on sample 1a using, Pall Profile II filters. The fittering was accomplished by using 6 stages with a final filter having a pore size of 0.5 microns. Table 1 below sets forth the various parameters of the mean particle diameter, standard deviation, and the maximum particle size before (1a) and after filtration (1b) as determined by MICROTRAC®-UPA measurements. Either technique described in step 2 or step 3 could be used to remove particles above 1 micron, and particularly above 0.5 micron.

TABLE 1

| Sample | Kontron Pip Count | Mean (μm) Diameter | Max (μm) Diameter |
|---|---|---|---|
| 1a Unprocessed | 342 | 0.1961 ± 0.0127 | 0.6089 ± 0.1418 |
| 1b Filtered | 19 | 0.1665 ± 0.0067 | 0.4270 ± 0.0455 |
| 1c Centrifuged | 38 | 0.1416 ± 0.0064 | 0.3939 ± 0.0673 |

The Kontron Pip count shows a dramatic reduction which is a direct consequence of the removal of particles larger than 1 micron, and particularly above 0.5 micron.

Step 4

Ultrafiltration was conducted on sample 1c using a 10 K Omeg,a membrane from Pall Filtron to remove the free species. This technique utilizes a cross-flow membrane technique. A total of 5 diafiltration volumes were performed to prepare sample 1d. Table 2 below sets forth the ionic species before (1c) and after ultrafiltration (1d). The concentrations in the Table are based on parts per million on a solid basis.

TABLE 2

| Sample | $Na^+$ (ppm) | $NO_2^-$ (ppm) |
|---|---|---|
| 1c Initial | 20700 | 7400 |
| 1d Ultrafiltration | 12300 | 140 |

As indicated in Table 2, the free species of $Na^+$ and $NO_2^-$ was substantially reduced.

Example 2

Step 1

Sulfanilic acid (12.5 g.), carbon black (100 g.) having a nitrogen surface area of 200 $m^2$/g and a DBPA of 122 ml/100 g., sodium nitrite (5.23 g.) and deionized water (100 g.) were mixed together in a pin pelletizer to produce product 2. Sufficient water was added to produce sample 2a having a 15% by weight solids content.

Step 2

Centrifugation was conducted on this dispersion using a Pilotfuge from Carr Separations, Inc. and operating at a centrifugation force of 15,000 G and a flow rate of 600 ml/min. Table 3 below sets forth the various parameters of the mean particle diameter, standard deviation, and the maximum particle size before (2a) and after centrifugation (2c) as determined by MICROTRAC®-UPA measurements. Either technique described in step 2 or 3 could be used to remove particles above 1 micron, particularly above 0.5 micron.

Step 3

Filtration was conducted on sample 2a using Pall Profile II filters. The filtering was accomplished by using 6 stages with a final filter having a pore size of 0.5 microns. Table 3 below sets forth the various parameters of the mean particle diameter, standard deviation, and the maximum particle size before (2a) and after filtration (2b) as determined by MICROTRAC®-UPA measurements. Either technique described in step 2 or 3 could be used to remove particles above 1 micron, particularly above 0.5 micron.

TABLE 3

| Sample | Kontron Pip Count | Mean ($\mu$m) Diameter | Max ($\mu$m) Diameter |
|---|---|---|---|
| 2a Unprocessed | 167 | 0.1448 ± 0.0109 | 0.4208 ± 0.0754 |
| 2b Filtered | 84 | 0.1235 ± 0.0094 | 0.3570 ± 0.0334 |
| 2c Centrifuged | 8 | 0.1257 ± 0.0052 | 0.3584 ± 0.0431 |

The Kontron Pip count shows a dramatic reduction which is a direct consequence of the removal of particles larger than 1 micron, particularly above 0.5 micron.

Step 4

Ultrafiltration was conducted on sample 2c using a 10 K Omega membrane from Pall Filtron to remove free species. This technique utilizes a cross-flow membrane technique. A total of 5 diafiltration volumes were performed to prepare sample 2d. Table 4 below sets forth the ionic species before (2c) and after ultrafiltration (2d).

Step 5

Ion exchange was used to replace the remaining sodium ions with potassium ions. Fifty grams of Amberlite®R7 IR120-H was added to a 50 ml solution containing distilled water and 28.5 g. of potassium hydroxide and stirred for thirty minutes. The liquid was removed from the resin, and the resin was rinsed three times with 200 ml of distilled water, obtaining a resin with $K^+$ ions. 200 g. of sample 2d was added to a beaker containing the $K^+$ resin and mixed with an overhead stirrer for 30 minutes. The resin was removed from the dispersion to prepare sample 2f. Table 4 below sets forth the free species before (2d) and after $K^+$ ion exchange (2f).

Step 6

Ion exchange was used to replace the remaining sodium with ammonium ions. Two hundred and fifty grains of sample 2d was added to a beaker containing 50 g. of IONAC® C-249 ($NH_4^+$) resin. An overhead stirrer mixed the resin for thirty minutes before the resin was removed leaving sample 2 g. Table 4 below sets forth the free ionic species before (2d) and after $NH_{4+}$ ion exchange (2g).

TABLE 4

| Sample | $Na^+$ (ppm) | $NO_2^-$ (ppm) | $K^+$ (ppm) | $NH_4^+$ (ppm) |
|---|---|---|---|---|
| 2c Initial | 15600 | 3200 | — | — |
| 2d Ultrafiltered | 10300 | 20 | — | — |
| 2f $K^+$ exchanged | 300 | 20 | 16600 | — |
| 2g $NH_4^+$ exchanged | 500 | 20 | — | 8000 |

Example 3

Step 1

P-Amino benzoic acid (12.0 g.), carbon black (100 g.) having a nitrogen surface area of 220 $m^2/g$ and a DBPA of 112 ml/100 g., sodium nitrite (6.04 g.) and deionized water (160 g.) were mixed together in a pin pelletizer to produce product 3. Sufficient water was added to produce sample 3a having a 15% by weight solids content.

Step 2.

Centrifugation was conducted on this dispersion using, a Pilotfuge from Carr Separation, Inc. and operating at a centrifugation force of 15,000 G and a flow rate of 600 ml/min. Table 5 below sets forth the various parameters of the mean particle diameter, standard deviation, and the maximum particle size before (3a) and after centrifugation (3c) as determined by MICROTRAC®-UPA measurements.

TABLE 5

| Sample | Mean ($\mu$m) Diameter | Max ($\mu$m) Diameter |
|---|---|---|
| 3a Unprocessed | 0.1649 ± 0.0340 | 0.6026 ± 0.3357 |
| 3c Centrifuged | 0.1356 ± 0.0042 | 0.3705 ± 0.0330 |

Step 3

Ultrafiltration was conducted on sample 3c using a 10 K Omega membrane from Pall Filtron to remove the free species. This technique utilizes a cross-flow membrane technique. A total of 5 diafiltration volumes were performed to prepare sample 3d. Table 6 below sets forth the ionic species before (3c) and after ultrafiltration (3d). The concentrations in Table 6 are based on parts per million on a solid basis.

Step 4

Ion exchange was used to replace the remaining sodium ions with ammonium ions. The dispersion was passed through a cation column containing Purolite C100-$NH_4$ resin and having a column size of 1.2 $ft^3$ to produce sample 3g. Table 6 below sets forth the free ionic species before (3d) and after cation exchange (3g).

TABLE 6

| Sample | $Na^+$ (ppm) | $NO_2^-$ (ppm) | Benzoates (ppm) | $NH_4^+$ (ppm) |
|---|---|---|---|---|
| 3c Initial | 20500 | 11000 | 16600 | <1 |
| 3d Ultrafiltered | 10000 | 250 | 3000 | <1 |
| 3g $NH_4^+$ exchanged | 90 | 200 | 3000 | 7000 |

Example 4

Step 1

P-Amino benzoic acid (12.0 g), carbon black (100 g.) having a nitrogen surface area of 220 $m^2/g$ and a DBPA of 112 ml/100 g., sodium nitrite (6.04 g.) and deionized water (160 g.) were mixed together in a pin pelletizer to produce product 4. Sufficient water was added to produce sample 4a having a 15% by weight solids content, Step 2

Centrifigation was conducted on this dispersion using a Pilotfuge from Carr Separations, Inc. operating at a centrifugation force of 15,000 G and a flow rate of 600 ml/min. Table 7 below sets forth the various parameters of the mean particle diameter, standard deviation, and the maximum particle size before (4a) and after centrifugation (4c) as determined by MICROTRAC®-UPA measurements.

TABLE 7

| Sample | Mean (μm) Diameter | Max (μm Diameter) |
|---|---|---|
| 4a Unprocessed | 0.1649 ± 0.0340 | 0.6026 ± 0.3357 |
| 4c Centrifuged | 0.1356 ± 0.0042 | 0.3705 ± 0.0330 |

Step 3

Another means of removing a substantial amount of the free ionic species from a dispersion was by an ion exchange process to reduce or remove free ionic species. Forty kg. of a~15% dispersion of sample 4c was passed upward through a 3" (i.d.)×3' stainless steel column containing 1.6 kg of Amberlite® IRA-402 (OH) ion exchange resin (ROHM & HAAS) at a flow rate of 200 ml/min to obtain sample 4e. Table 8 below sets forth the free ionic species before (4c) and after anionic exchange (4e). The concentrations in the Table are based in parts per million on a solid basis.

Step 4

The pH of sample 4e was ~12. The ion exchange resin Amberlite®P IR-120H was titrated to reduce the pH to~9.0. Table 8 below sets forth the free ionic species before (4e) and after pH adjustment (4f).

Step 5

Ion exchange was used to replace the remaining sodium ions with ammonium ions. 19.4 kg of sample 4f was passed upward through a 4" (i.d.)×3.5' stainless steel column containing 7.1 kg of IONAC® C-249 ($NH_4^+$) resin at a flow rate of 200 ml/min creating sample 4g. Table 8 below set; forth the free ionic species before (4f) and after $NH_4^+$ ion exchange (4g).

TABLE 8

| Sample | pH | $Na^+$ (ppm) | $NO_2^-$ (ppm) | Benzoates (ppm) | $NH_4^+$ (ppm) |
|---|---|---|---|---|---|
| 4c Initial | 8.8 | 17500 | 9000 | 16600 | — |
| 4e Anion exchanged | 12.4 | 18000 | <100 | — | — |
| 4f pH adjustment | 9.2 | 8000 | <100 | — | — |
| 4g $NH_4^+$ exchanged | 8.2 | 300 | <100 | 3000 | 5900 |

Example 5

Step 1

P-Amino benzoic acid (7 kgh/r), carbon black (50 kg/hr), having a nitrogen surface area of 200 $m^2/g$ and a DBPA of 122 ml/100 g (30%) sodium nitrite solution (10.6 kg/hr) and deionized water (50 kg/hr) were mixed together in a continuous pin pelletizer to produce product 5. Sufficient water was then added to produce sample 5a having a 15% weight solids content.

Step 2

Centrfiigation was conducted on sample 5a using a Pilotfuge from Carr Separations, inc. and operating at a centrifugation force of 15,000 G and a flow rate of 100 ml/min. Table 9 below sets forth the various parameters of the mean particle diameter, standard deviation and the maximum particle size before (5a) and after centrifugation (5b) as determined by MICROTRAC®-UPA measurements.

TABLE 9

| Sample | Mean (μm) Diameter | Max (μm) Diameter | % Solids Lost |
|---|---|---|---|
| 5a Unprocessed | 0.1791 ± 0.0013 | 0.5532 ± 0.0949 | — |
| 5b Centrifuged | 0.1127 ± 0.0011 | 0.3073 ± 0.0257 | 5.94 |

TABLE 9-continued

| Sample | Mean (μm) Diameter | Max (μm) Diameter | % Solids Lost |
|---|---|---|---|
| 5c Diafiltered | 0.1091 ± 0.0034 | 0.2738 ± 0.217 | 1.28 |
| 5d Diafiltered | 0.1381 ± 0.0025 | 0.3871 ± 0.0307 | 1.79 |
| 5e Centrifuged | 0.1196 ± 0.0057 | 0.3290 ± 0.0564 | 2.96 |

Step 3

Ultrafiltration was conducted on sample 5b using a 10 K Omega membrane from Pall Filtron to remove the free species. This technique utilizes a cross flow membrane technique. A total of 5 diafiltration volumes were performed to prepare sample 5c. The parameters of mean particle diameter, standard deviation and the maximum particle size are shown in Table 9.

Step 4

Ultrafiltration was conducted on sample 5a using a 10K Omega membrane from Pall Filtron to remove the free species. This technique utilizes a cross flow membrane technique. A total of 5 diafiltration volumes were performed to prepare sample 5d. The parameters of mean particle diameter, standard deviation and the maximum particle size are shown above in Table 9.

Step 5

Centrifugation was conducted on sample 5d using a Pilotfuge from Carr Separations, inc. and operating at a centrifugation force of 15,000 G and a flow rate of 100 ml/min. Table 9 above sets forth the various parameters of the mean particle diameter, standard deviation and the maximum particle size before 5a and after the centrifulgation step (5e) as determined by MICROTRAC® UPA measurements.

Example 6

As can be seen from the above examples, a substantial amount of free species (ions and organics) were removed by the process of the claimed invention, which can have a beneficial effect in ink, particularly inkjet, and coating formulations because such purified dispersions minimize the potential for side reactions of the ink, particularly inkjet, or coating dispersion with the various remaining ink or coating components. A purified dispersion also improves the compatibility of the colorant with the remaining ink components since less impurities are present which can have a detrimental effect if side reactions occur. Two samples, 3a and 3g, were then formed into an inkjet ink in a manner described in U.S. Pat. No. 5,571,31 1. Formulation A consisted of 5 wt. % carbon black, 10 wt. % ethylene glycol, 10 wt. % 2-pyrrolidinone, and 4 wt. % isopropyl alcohol. Formulation B consisted of 5 wt. % carbon black, 10 wt. % ethylene glycol, 10 wt. % di(ethylene glycol), and 4 wt. % isopropyl alcohol. Various properties of the inkjet ink were then tested and compared with control samples which were not purified using the process of the present invention. The results are set forth in Table 10, wherein O.D. is the optical density and WF is the waterfastness results.

TABLE 10

| Optical Density and Waterfastness | | | | |
|---|---|---|---|---|
| Sample | | Plover | Hammermill | Gilbert Bond |
| 3a Formulation A | O.D. | 1.36 | 1.32 | 1.43 |
| | WF. | >24 hours | 1 hour | >1 hour |
| 3a Formulation B | O.D. | 1.41 | 1.46 | 1.47 |
| | WF. | >24 hours | 1 hour | >1 hour |
| 3g Formulation A | O.D. | 1.36 | 1.33 | 1.45 |
| | WF. | 5 min | 1 min | 1 min |
| 3g Formulation B | O.D. | 1.41 | 1.30 | 1.43 |
| | WF. | 5 min | 1 min | 1 min |

These examples show that waterfastness is generally improved in sample 3g as compared to sample 3a.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process to purify a dispersion comprising a) ionic stabilized colloidal particles having cations and anions, wherein either the cations or anions are counterions, and b) free species in a solution, said process comprising, in any order, the following steps:

(a) substantially removing particles having a particle size above about 1 micron;

(b) substantially removing the free species; and (c) exchanging at least a portion of said counterions that form a part of the ionic stabilized colloidal particles with alternate counterions.

2. The process of claim 1, wherein particles having a particle size above about 0.5 micron are substantially removed in step (a).

3. The process of claim 1, wherein step (a) is accomplished by centrifugation.

4. The process of claim 3, wherein said centrifugation occurs at a centrifugal force of at least about 5,000 Gs.

5. The process of claim 3, wherein said centrifugation occurs at a G force of at least about 15,000 Gs.

6. The process of claim 3, wherein said centrifugation occurs at a G force of from about 15,000 to about 20,000 Gs.

7. The process of claim 3, wherein said centrifugation is a solid-bowl centrifugation.

8. The process of claim 3, wherein said centrifugation is a tubular-bow centrifugation.

9. The process of claim 3, wherein said centrifugation is with a semi-continuous feed rate.

10. The process of claim 9 wherein said feed rate is from about 500 ml/min to about 10 L/min.

11. The process of claim 3, wherein said centrifugation is conducted at ambient temperatures.

12. The process of claim 3, wherein said centrifugation includes a recirculating bath.

13. The process of claim 3 wherein said dispersion during said centrifugation has a viscosity of from about 1 cP to about 8 cP.

14. The process of claim 1, wherein step (a) occurs before the steps (b) and (c).

15. The process of claim 1, wherein step (a) occurs after step (b) or step (c).

16. The process of claim 1, wherein step (a), step (b) or step (c) is repeated one or more times.

17. The process of claim 1, wherein step (a) is accomplished by filtration.

18. The process of claim 17, wherein said filtration uses one or more filters having a pore size of from about 0. 1 microns to about 100 microns.

19. The process of claim 17, wherein said filtration has a flow rate of from about 0.14 $L/m^2s$ to about 0.47 $L/m^2s$.

20. The process of claim 1, wherein step (b) is accomplished by ultrafiltration or diafiltration having a membrane.

21. The process of claim 20, wherein said membrane has a molecular weight cutoff of at least 10,000.

22. The process of claim 21, wherein said membrane has a molecular weight cutoff from about 10,000 to about 50,000.

23. The process of claim 20, wherein said membrane has a channel size of from about 0.5 mm to about 1.5 mm.

24. The process of claim 20, wherein said membrane has a permeate flux of at least about 5 gal./$ft^2$ per day.

25. The process of claim 20, wherein said membrane has a permeate flux of from about 5 to about 30 gal./$ft^2$ per day.

26. The process of claim 20, wherein said membrane has a sufficient surface area to substantially remove the free ionic species in one or more passes.

27. The process of claim 20, wherein said ultrafiltration or diafiltration is a cross-flow membrane separation.

28. The process of claim 1, wherein said colloidal particles are pigments.

29. The process of claim 28, wherein said pigments are carbon pigments.

30. The process of claim 29, wherein said carbon pigments are carbon black, graphite, vitreous carbon, activated charcoal, activated carbon, or mixtures thereof.

31. The process of claim 30, wherein said carbon black has an attached organic group.

32. The process of claim 31, wherein said organic group comprises an aromatic group directly attached to said carbon black.

33. The process of claim 32, wherein said organic group is selected from the group consisting of: $—C_6H_4—COO^-X^+$; $—C_6H_4—SO_3^-X^+$; $—C_6H_2—(COO^-X^+)_3$; $—C_6H_3—(COO^-X^+)_2$; $—C_6H_3—(CF_3)_2$; $—C_6H_4—(CF_3)$; $—(CH_2)_z—(COO^-X^+)$; $—C_6H_4—(CH_2)_z—(COO^-X^+)$; $—C_6H_4—(NC_5H_5)^+Y^-$, and combinations thereof, wherein X is a cation selected from the group consisting of $Na^+$, $H^+$, $K^+$, $NH_4^+$, $Li^+$, $Ca^{2+}$, and $Mg^{2+}$, z is an integer from 1 to 18, and Y is an anion selected from the group consisting of $NO_3^-$, $OH^-$, and $CH_3COO^-$.

34. The process of claim 1, wherein said counterions are $Na^+$ and said alternate counterions are $NH_4^+$.

35. The process of claim 1, wherein said solution is an aqueous solution.

36. The process of claim 1, wherein step (c) is accomplished by an ion exchange process.

37. The process of claim 1, wherein step (c) is accomplished by a modified three compartment electrodialysis process.

38. A process for purifying and classifying an ink dispersion comprising a) stabilized colloidal particles having cations and anions and b) free species in a solution comprising the following steps:

(a) substantially removing the free species by ultrafiltration or diafiltration having a membrane; and (b) substantially removing particles having a particle size above about 0.5 micron by centrifugation.

39. The process of claim 38, wherein said dispersion is subject to the further step of exchanging at least a portion of said counterions that form a part of the ionic stabilized colloidal particles with alternate counterions.

40. The process of claim 39, wherein said counterions are $Na^+$ and said alternate counterions are $NH_4^+$.

41. The process of claim 38 wherein, substantially all of the particles in said dispersion having a particle size above about 1 micron are removed prior to step (a).

42. The process of claim 41, wherein, said particles are removed by centrifugation.

43. The process of claim 38, wherein said colloidal particles are pigments.

44. The process of claim 43, wherein said pigments are carbon black.

45. The process of claim 44, wherein said carbon black has an attached organic group.

46. The process of claim 45, wherein said organic group is selected from the group consisting of: $—C_6H_4—COO^-X^+$; $—C_6H_4—SO_3^-X^+$; $—C_6H_2—(COO^-X^+)_3$; $—C_6H_3—(COO^-X^+)_2$; $—C_6H_3—(CF_3)_2$; $—C_6H_4—(CF_3)$; $—(CH_2)_z—(COO^-X^+)$; $—C_6H_4—(CH_2)_z—(COO^-X^+)$; $—C_6H_4—(NC_5H_5)^+Y^-$, and combinations thereof, wherein X is a cation selected from the group consisting of $Na^+$, $H^+$, $K^+$, $NH_4^+$, $Li^+$, $Ca^{2+}$, and $Mg^{2+}$, z is an integer from 1 to 18, and Y is an anion selected from the group consisting of $NO_3^-$, $OH^-$, and $CH_3COO^-$.

* * * * *